(12) United States Patent
Bell et al.

(10) Patent No.: US 10,647,871 B2
(45) Date of Patent: May 12, 2020

(54) HIGH BLOCK, TACK AND SCRUB RESISTANT COATING COMPOSITION

(71) Applicant: Valspar Sourcing, Inc., Minneapolis, MN (US)

(72) Inventors: Tyler Bell, Lake In The Hills, IL (US); Robert Sandoval, Crystal Lake, IL (US); Mary Jane Hibben, Elburn, IL (US); Michael C. Wildman, Hoffman Estates, IL (US)

( * ) Notice: Subject to any disclaimer, the term of this patent is extended or adjusted under 35 U.S.C. 154(b) by 141 days.

(21) Appl. No.: 15/594,953

(22) Filed: May 15, 2017

(65) Prior Publication Data

US 2017/0247565 A1  Aug. 31, 2017

Related U.S. Application Data

(63) Continuation-in-part of application No. 15/012,240, filed on Feb. 1, 2016, now Pat. No. 10,273,378, and a continuation-in-part of application No. 15/437,879, filed on Feb. 21, 2017, now Pat. No. 10,301,501, which is a continuation of application No. 14/285,722, filed on May 23, 2014, now Pat. No. 9,611,393, which is a continuation of application No. PCT/US2012/069108, filed on Dec. 12, 2012, said application No. 15/012,240 is a continuation-in-part of application No. 14/285,722, which is a continuation of application No. PCT/US2012/069108.

(60) Provisional application No. 61/576,021, filed on Dec. 15, 2011.

(51) Int. Cl.

| C09D 133/12 | (2006.01) |
|---|---|
| C09D 133/08 | (2006.01) |
| C09D 133/06 | (2006.01) |
| C09D 133/26 | (2006.01) |
| C09D 5/00 | (2006.01) |
| C09D 7/80 | (2018.01) |

(52) U.S. Cl.
CPC ............. *C09D 133/12* (2013.01); *C09D 5/00* (2013.01); *C09D 7/80* (2018.01); *C09D 133/06* (2013.01); *C09D 133/08* (2013.01); *C09D 133/26* (2013.01)

(58) Field of Classification Search
CPC .......... C09D 133/12; C09D 7/80; C09D 5/00; C09D 133/06; C09D 133/08; C09D 133/26
USPC ..................................................... 524/813
See application file for complete search history.

(56) References Cited

U.S. PATENT DOCUMENTS

| 5,021,469 | A | 6/1991 | Langerbeins et al. |
|---|---|---|---|
| 5,208,285 | A | 5/1993 | Boyce et al. |
| 6,060,532 | A | 5/2000 | Frankel et al. |
| 6,488,760 | B1 | 12/2002 | Binns et al. |
| 6,723,779 | B2 | 4/2004 | Drujon et al. |
| 6,762,230 | B2 | 7/2004 | Brandenburger et al. |
| 6,992,121 | B1 * | 1/2006 | Peters .................. C08F 2/22 523/201 |
| 7,049,352 | B2 | 5/2006 | Gould et al. |
| 7,285,590 | B2 * | 10/2007 | Holub .................. C08F 2/001 523/201 |
| 7,612,126 | B2 | 11/2009 | Roschmann et al. |
| 7,659,340 | B2 | 2/2010 | Coward et al. |
| 7,812,079 | B2 | 10/2010 | Killilea et al. |
| 7,812,090 | B2 | 10/2010 | Killilea et al. |
| 7,906,577 | B2 | 3/2011 | Zong et al. |
| 8,013,050 | B2 | 9/2011 | Mestach et al. |
| 8,822,580 | B2 | 9/2014 | Korenkiewicz et al. |
| 8,980,995 | B2 | 3/2015 | Yang et al. |
| 9,611,393 | B2 | 4/2017 | Hibben et al. |
| 2007/0282046 | A1 | 12/2007 | Killilea et al. |
| 2008/0058473 | A1 | 3/2008 | Freidzon et al. |
| 2009/0143528 | A1 | 6/2009 | Mestach et al. |
| 2010/0003442 | A1 | 1/2010 | Even et al. |
| 2011/0151265 | A1 | 6/2011 | Killilea et al. |
| 2016/0145460 | A1 | 5/2016 | Bell et al. |
| 2017/0226369 | A1 | 8/2017 | Hibben et al. |
| 2017/0335127 | A1 | 11/2017 | Ewert et al. |

FOREIGN PATENT DOCUMENTS

| CN | 101175827 A | 5/2008 |
|---|---|---|
| KR | 10-2010-0117609 A | 11/2010 |
| WO | WO 2003/031526 A1 | 4/2003 |
| WO | WO 2005/054384 A1 | 6/2005 |
| WO | WO 2011/084162 A1 | 7/2011 |
| WO | WO 2011/133487 A1 | 10/2011 |
| WO | WO 2013/090341 A1 | 6/2013 |

OTHER PUBLICATIONS

Innovative Chemical Technologies, Thetawet FS-8250 Technical Data Sheet, (1 page). Material available prior to Dec. 15, 2011.

* cited by examiner

*Primary Examiner* — Kelechi C Egwim

(74) *Attorney, Agent, or Firm* — Mueting, Raasch & Gebhardt, P.A.

(57) ABSTRACT

The present invention is directed to a coating composition or paint comprising a multistage latex with at least first and second stages, wherein the composition or paint is substantially free of volatile organic compounds (VOC) and capable of film formation even in the absence of coalescent agents. The base paint formulation is capable of being tinted at a point-of-sale (i.e. in-store) using a colorant composition of a type and quantity required to produce a paint of desired color and finish. The paints, show improved block resistance, scrub resistance and tack resistance.

28 Claims, 1 Drawing Sheet

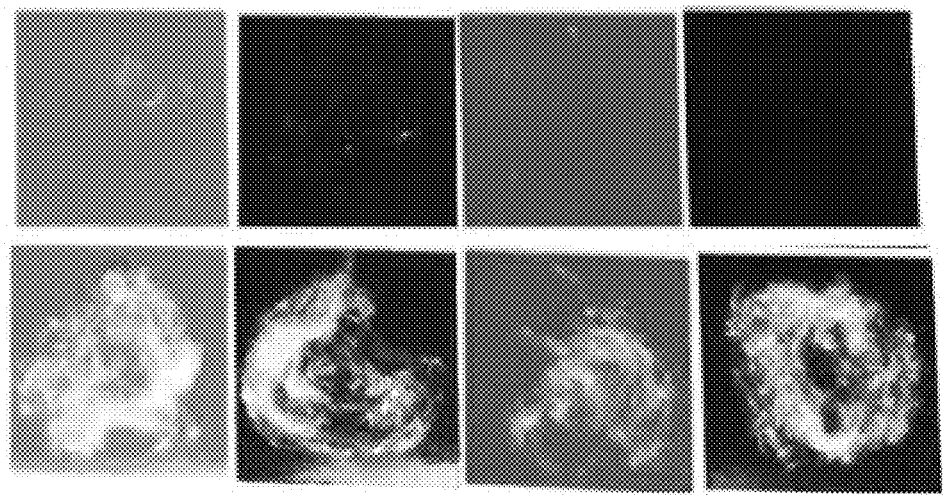

HIGH BLOCK, TACK AND SCRUB RESISTANT COATING COMPOSITION

CROSS REFERENCE TO RELATED APPLICATION(S)

This application is a continuation in part of U.S. application Ser. No. 15/012,240 filed on 1 Feb. 2016 and entitled: "High Block, Tack and Scrub Resistant Coating Composition," which is a continuation in part of U.S. application Ser. No. 14/285,722. This present application is also a continuation in part of U.S. application Ser. No. 15/437,879 filed on 21 Feb. 2017 and entitled: "High Block, Tack and Scrub Resistant Polymer," which is a continuation of U.S. Ser. No. 14/285,722 filed on 23 May 2014 (now U.S. Pat. No. 9,611,383) and entitled: "High Block, Tack and Scrub Resistant Polymer," which is a continuation of PCT/US2012/069108 filed on 12 Dec. 2012 which claims the benefit of Provisional Application No. 61/576,021 filed 15 Dec. 2011, each of which are incorporated by reference herein in its entirety.

BACKGROUND OF THE INVENTION

Conventionally, paint compositions containing latex polymer particles also include a coalescent in addition to pigments and fillers. The coalescent functions as a solvent as well as a plasticizer for the polymer particles to soften the latex polymer particles and assist in the formation of a continuous coating or film after applying to a surface and allowing to dry.

Useful coalescents are generally stable in the presence of water, compatible with other ingredients typically used in paint formulations, particularly the latex polymers, such that the stability of the latex-based composition is not compromised. Typical coalescent agents contain volatile organic compounds (VOC) and are sufficiently volatile to escape when the applied coating composition is allowed to dry, but sufficiently nonvolatile to evaporate more slowly than other ingredients (e.g., drying retarders, antifreezes) that delay film formation.

For environmental and regulatory reasons, it has become imperative to develop latex polymers that can be used in paint and coating compositions without the use of volatile organic compounds (VOCs). Coalescent agents of the type described in U.S. Pat. Nos. 6,762,230 and 7,812,079, for example, are low-VOC compounds that meet stringent environmental requirements, while facilitating film formation.

To make paint formulations of a desired color and finish, base paint compositions are combined at a point-of-sale with low-VOC colorant compositions of the type described in U.S. Pat. No. 7,659,340, for example. However, typical low VOC paints with low VOC colorants tend to form soft, tacky coatings that show poor performance characteristics, such as poor block resistance and poor scrub resistance, for example. This situation is further complicated in deeply colored paint formulations that require high loading of the low VOC or zero-VOC colorants, which generally have residual non-volatile soft components, making hard film formation even more difficult.

From the foregoing, it will be appreciated that there is a need for latex compositions for use in paint formulations, including deeply colored formulations that form hard films in the presence of low VOC or zero-VOC components soft components, even in the absence of coalescent agents, and demonstrate excellent performance characteristics, including block, scrub and tack resistance.

SUMMARY OF THE INVENTION

The present invention provides coating compositions that include multistage latex polymers, for use in low VOC, colored paint formulations. These formulations include deeply colored formulations, made by adding colorant compositions to base paint formulations at a point-of-sale. Surprisingly, and in contravention of industry bias, systems that include the latex polymer described herein are preferably capable of film formation, and the paints demonstrate excellent tack resistance, block resistance and scrub resistance.

Accordingly, in one embodiment, the present invention provides base paints that include a multistage latex polymer having at least a first stage and a second stage. In another embodiment, the present invention provides a method of making a paint formulation of a desired color by adding a colorant composition to a base paint formulation at a point-of-sale, wherein the base paint formulation includes a multistage latex polymer having at least a first stage and a second stage. In another embodiment, the present invention provides a method comprising the steps of preparing a first monomer mixture for the first stage, preparing a second monomer mixture for the second stage, and feeding the first and second monomer mixtures in a sequential feed process to form the multistage latex polymer, wherein the latex polymer has low VOC content, and is preferably capable of film formation in the absence of a coalescent.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.). The term "ethylenically unsaturated" refers to compounds that include a carbon-carbon double bond (i.e. —C=C—).

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") is as measured by ASTM method D2369-90, and means the weight of VOC per volume of the coating solids, and is reported, for example, as grams VOC per liter (g/L).

As used herein, the term "glass transition temperature" or "Tg" refers to the temperature at which an amorphous, solid material undergoes a reversible transition to a molten, rubber-like state. Unless otherwise indicated, the Tg values described herein are theoretical values predicted using the Fox equation. Application of the Fox equation to estimate the Tg of polymers is well known in the art.

The term "substantially free of VOC" means that the compositions of the present invention contain less than about 50 g/L VOC. Unless otherwise indicated, the terms "low VOC" and "substantially free of VOC" are used interchangeably herein. The term "essentially free of VOC" means that the compositions of the present invention contain less than 5 g/L of VOCs. The terms, "zero VOC" and "essentially free of VOC" are used interchangeably herein.

The term "substantially free," when applied to components of a composition and not to VOC levels, means that the compositions of the present invention contain no more than about 5 wt % of a particular component, based on total weight of solids in the composition. For example, a composition of the present invention that is substantially free of coalescent contains no more than about 5 wt % coalescent. A composition of the present invention that is essentially free of coalescent contains no more than about 0.5 wt % of coalescent.

The term "water-dispersible" in the context of a water-dispersible polymer means that the polymer can be mixed into water (or an aqueous carrier) to form a stable mixture. For example, a mixture that readily separates into immiscible layers is not a stable mixture. Unless otherwise indicated, the term "water-dispersible" is intended to include the term "water-soluble." In other words, by definition, a water-soluble polymer is also considered to be a water-dispersible polymer.

The term "dispersion," as used herein, in the context of a dispersible polymer refers to the mixture of a dispersible polymer and a carrier. Unless otherwise indicated, the term "dispersion" is intended to include the term "solution."

As used herein, the term "pigment" refers to an organic or inorganic material, and is typically (but not exclusively) in solid form.

As used herein, the term "colorant" refers to a dispersion of pigment in a mobile phase, typically in liquid form, which is added to a coating composition to modify or alter its color or hue, typically at a point-of-sale. As the term is used herein, a colorant may include one or more pigments, dyes and/or inks, along with other additives.

As used herein, the term "base paint" means a composition that includes a vehicle component containing a binder or resin component, and a pigment or filler component dispersed into the vehicle component. As used herein, the base paint formulation includes water as the vehicle, a latex polymer as the binder or resin component, and one or more pigments or fillers used to tone or opacify the base paint as the pigment component.

The base paints described herein are "in-store tintable," meaning that the base paints are present in containers (such as paint cans, for example) and can be tinted or colored by adding a colorant composition in the store, i.e. at a point of sale, to provide a paint formulation of a desired color and finish.

As used herein, the term "container" means any vessel (either with or without a lid or other type of closure) used to store, mix, tint or color a paint formulation, and includes the vessels in which paints are typically marketed and sold. Suitable containers include paint cans, paint bottles, containers made of metal, containers made of plastic and/or other polymeric materials, and the like.

The term "headspace," as used herein, refers to the volume remaining in a container after the container has been filled with a base paint.

The term "scrub resistance," as used herein, refers to the ability of the surface of a coating film or paint film to resist being worn away or to maintain its original appearance when rubbed with or against an abrasive surface, typically during cleaning. To measure scrub resistance, a standard test method, ASTM D2486-96 (Standard Test Method for Scrub Resistance of Wall Paints).

As used herein, the term "block resistance" means the ability of a coating film or paint film, when applied to two surfaces, not to stick to itself on prolonged contact when pressure is applied for a defined period of time. It is a measure of the degree of hardness and/or degree of cure of a film of a coating composition or paint formulation, and is measured by a standard test method, ASTM D4946-89 (Standard Test Method for Blocking Resistance of Architectural Paints).

The term "print resistance," as used herein refers to the tendency of a coating film or paint film to take on the imprint of an object that is placed on it. Print resistance is measured using standard methods known in the art.

The term "tack resistance," as used herein, refers to the residual tack of a coating film or paint film after it has been applied to a substrate surface and dried. Tack resistance was measured using standard methods known in the art.

Unless otherwise indicated, a reference to a "(meth)acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DESCRIPTION OF THE DRAWINGS

FIG. 1 is a photographic representation of the Cotton Ball Test.

DETAILED DESCRIPTION

Embodiments of the invention described herein feature an in-store tintable base paint formulation that includes a multistage latex polymer having at least a first stage and a second stage, wherein the latex is preferably capable of forming a film even in the absence of a coalescent agent. The base paint formulation as described herein is preferably substantially free of volatile organic compounds (VOC), and is used to make coating compositions or paints, including deeply colored paints, by the addition of colorant compositions to the base paint at the point-of-sale. Preferred paints demonstrate excellent performance characteristics, such as optimal block resistance, and superior scrub resistance and tack resistance, for example.

In an embodiment, the invention described herein includes an in-store tintable base paint that comprises a multistage latex polymer. The term "multistage," as used herein with respect to a latex means the latex polymer was made using discrete, sequential charges of two or more monomers or monomer mixtures, or was made using a continuously-varied charge of two or more monomers.

A multistage latex does not necessarily exhibit a single Tg inflection point as measured by differential scanning calorimetry (DSC). For example, a DSC curve for a multistage latex made using discrete charges of two or more monomers may exhibit two or more Tg inflection points. In cases where a DSC curve shows only a single Tg inflection point, or even no Tg inflection points, it may be difficult to determine whether the latex is single stage or multistage, as the observation of a Tg inflection point depends on various factors, including the relative concentration of monomers in a particular stage. The presence or absence of Tg inflection points on a DSC curve is not dispositive, but a multistage latex may be described in terms of the theoretical Tg values for each monomer stage, as determined by the Fox equation.

In an embodiment, a method of making a multistage latex having at least a first stage and a second stage is described herein. The method includes steps of providing a first monomer or mixture for the first stage, providing a second monomer or mixture for the second stage; and feeding the first and second monomers or mixtures into a reaction vessel to form a multistage latex that is capable of film formation in the absence of a coalescent agent.

Various methods can be used to prepare the multistage latex described herein, including for example, sequential monomer feed and continuously varying monomer feed techniques. In a sequential monomer feed process, a first monomer or monomer mixture is fed during the early stages of polymerization, and a second monomer (i.e. a different monomer, or a mixture of monomers present in different ratios than in the first monomer mixture) is fed during later stages of polymerization. In a varying monomer feed process, a first monomer composition is fed, followed by the addition of a second monomer at certain points in the polymerization process, and at different speeds. By controlling the type of monomers selected for the feed process, a multistage latex suitable for low VOC, coating compositions or paints may be formed, and the latex preferably provides excellent performance characteristics, such as, for example, block resistance, scrub resistance, tack resistance, and the like, for such coating or paint formulations.

In an embodiment, the multistage latex composition described herein is made by a sequential monomer feed process. In an aspect, polymerization begins with a high Tg monomer feed followed by a low Tg monomer feed, and vice-versa. In a preferred aspect, polymerization begins with a high Tg monomer feed, followed by a low Tg monomer feed.

In an embodiment, the multistage latex composition described herein is made using varying monomer feeds. The resulting polymer will typically have a DSC curve that exhibits no Tg inflection points, and could be said to have an essentially infinite number of Tg stages. The resultant multistage latex will have a gradient Tg from high to low, or vice-versa, depending on the order that monomers of high Tg are fed into the reaction.

In a preferred aspect, the multistage latex described herein is made by a sequential monomer feed process using at least two distinct feeds of monomers. In an aspect, a high Tg stage (i.e. a hard stage) is fed first into a reactor vessel, and a low Tg stage (i.e. a soft stage) is added at a later stage in the process. A multistage latex may be formed, and after coalescence, the composition will typically display two distinct Tg values, or at least one Tg corresponding to the monomer stage present at higher concentration. Without being bound to theory, it is expected that no distinct Tg will be observed or detected by DSC for a monomer or monomer mixture in a particular stage that is present in very small quantities relative to the other monomer or monomer mixture.

In an aspect, the multistage latex optionally includes a seed phase, i.e. a relatively small monomer or polymer particle, but the seed is not required, nor essential for preparation or optimal performance of the multistage latex when used in a coating composition or paint formulation.

In an aspect, the relative positions of the first and second phases may be internal and external respectively, or vice-versa. In another aspect, the first and second phases may be neighboring or adjacent. Without being bound by theory, it is believed that the relative position of the stages of the multistage latex is influenced by the method used to make the latex. By controlling the monomers used in each stage of the sequential monomer feed process, the multistage latex described herein will contain about 10 wt % to 50 wt %, preferably about 20 to 40 wt %, more preferably about 25 to 35 wt % of monomers of the first stage, i.e. high Tg or hard stage monomers, and about 50 wt % to 90 wt %, preferably about 60 to 80 wt %, more preferably about 65 to 75 wt % of monomers of the second stage, i.e. low Tg or soft stage monomers, based on the total weight of the composition.

In an embodiment, by controlling the monomers used for each stage of the sequential monomer feed process, a multistage latex composition with optimal minimum film forming temperature (MFFT) is obtained. The MFFT is the minimum temperature at which the multistage latex composition will form a continuous film, i.e. the temperature below which coalescence does not occur. The MFFT of the multistage latex composition as described herein is preferably less than about 20° C., more preferably less than about 10° C. A base paint or other paint that includes the multistage latex described herein has MFFT of less than about 20° C., preferably less than about 10° C.

In an embodiment, the multistage latex described herein preferably includes at least two polymer portions. In a preferred embodiment, the multistage latex includes at least a first stage and a second stage. In an aspect, the multistage latex includes up to about 50%, preferably about 10% to 40%, more preferably 15% to 35% of one or more monomers or a mixture of monomers comprising the first stage. In an aspect, the multistage latex includes about 50%, preferably 60% to 90%, more preferably 75% to 85% of one or more monomers or a mixture of monomers comprising the second stage.

In an embodiment, the multistage latex described herein preferably includes at least two polymer portions with different Tg values. In a preferred embodiment, the multistage latex includes at least a first stage and a second stage. The first stage preferably has a Tg of about 0° C. to 120° C., more preferably about 50° C. to about 80° C. The second stage preferably has a Tg of greater than about −35° C. to 10° C. In an embodiment, where the multistage latex is intended for use in a pigmented high gloss or semi-gloss paint, the first stage preferably has Tg of about 0° to 120° C., more preferably 25° to 75° C., most preferably 45° to 55° C.

In an embodiment, the multistage latex described herein preferably includes at least two polymer portions, i.e. a first stage and a second stage, with different Tg values, where the difference in Tg ($\Delta Tg$) is about 60° C., preferably about 50° C. In an embodiment, where the multistage latex is intended for use in a pigmented high gloss or semi-gloss paint, the difference in Tg ($\Delta Tg$) is preferably about 60° C., more preferably about 50° C.

Without limiting to theory, it is believed that a smaller difference in Tg ($\Delta Tg$) between the first and second stage will yield a polymer composition with optimal gloss and scrub resistance.

In an embodiment, the invention described herein includes a multistage latex polymer having at least a first stage and a second stage. In an aspect, the first stage and second stage of the multistage latex separately and preferably include one or more ethylenically unsaturated monomers. In another aspect, the first and second stage of the multistage latex separately and preferably includes the one or more polymerization product(s) of (i) ethylenically unsaturated monomers, such as, for example, alkyl and alkoxy (meth)acrylates, vinyl esters of saturated carboxylic acids, monoolefins, conjugated dienes, optionally with (ii) one or more monomers, such as, for example, styrene, methyl methacrylate, butyl acrylate, 2-ethylhexyl acrylate, vinyl acetate, acrylonitrile, vinyl chloride, and the like. In an embodiment, the first stage or second stage of the multistage latex optionally includes one or more polyfunctional (meth)acrylate monomers. In an embodiment, the first stage and second stage separately and preferably also include one or more ethylenically unsaturated carboxy-functional amide monomers, e.g., ureido-functional monomers, such as monomers formed as the product of the reaction between aminoalkyl alkylene urea (e.g., amino ethylene urea, for example) with an ethylenically unsaturated carboxylic acid or anhydride (e.g., maleic anhydride, for example).

Suitable ethylenically unsaturated monomers of the first and second stage include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, α-methyl styrene, vinyl toluene, vinyl acetate, vinyl propionate, allyl methacrylate, and mixtures thereof. Preferred monomers include styrene, methyl methacrylate, methacrylic acid, acetoacetoxy ethyl methacrylate, butyl acrylate, and the like.

Suitable polyfunctional acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerytrithol tetraacrylate, and the like.

Suitable ureido-functional monomers include, for example, monomers with the —NR—(C═O)—NH— functionality, where R may be H, substituted or unsubstituted $C_1$-$C_{10}$ alkyl, substituted or unsubstituted $C_3$-$C_6$ cycloalkyl or heteroalkyl, and the like. Without being bound by theory, ureido-functional monomers are believed to promote the wet adhesion of a paint formulation to a substrate, where the formulation includes the multistage latex described herein.

In an embodiment, the first or second stage of the multistage latex each separately and preferably include about 90 to 99 wt %, more preferably about 94 to 96 wt %, and most preferably about 97 to 98 wt % of one or more ethylenically unsaturated monomers, and preferably up to about 5 wt %, more preferably about 0.05 to 4 wt %, and most preferably about 0.5 to 1.5 wt % of one or more ureido-functional monomers, based on the total weight of the monomers in the first or second stage respectively. For example, in a preferred embodiment, the first stage includes about 65 to 70 wt % methyl methacrylate, 15 to 20 wt % butyl acrylate, 2 to 4 wt % acrylic acid, 2 to 4 wt % DAAM, and about 0.5 to 1.5 wt % ureido-functional monomer. In a preferred embodiment, the second stage includes about 30 to 40 wt % methyl methacrylate, 45 to 55 wt % butyl acrylate, about 2 to 4 wt % DAAM, about 1 to 3 wt % methacrylic acid, and about 0.5 to 1.5 wt % ureido-functional monomer.

Conventionally, increasing the amount of acidic monomers tends to have a negative impact on scrub resistance. Without limiting to theory, it is believed that a composition with a high content (over 2% by weight) of acidic monomers will demonstrate poor scrub resistance. Indeed, when the first stage of the multistage latex described herein includes a high content of methacrylic acid, the scrub resistance falls off sharply.

Surprisingly, however, when acrylic acid is used in place of methacrylic acid in the compositions described herein, no substantial reduction in scrub resistance is observed, even at high content (over 2% by weight) of acrylic acid. Additionally, the higher level of acrylic acid in the first stage also helps improve gloss.

In an embodiment, the multistage latex described herein includes, optionally and preferably, a fluorosurfactant. As used herein, the term "fluorosurfactant" refers to synthetic organofluorine compounds with multiple fluorine atoms. Such compounds can be polyfluorinated, perfluorinated (i.e.

fluorocarbons), or partially fluorinated, and typically include a hydrophilic head and a fluorinated/hydrophobic tail. Suitable fluorosurfactants may be anionic or nonionic. Commonly used fluorosurfactants include, for example, fluoroalkanes, perfluoroalkanes, their derivatives, and the like. In an aspect, short chain fluorinated compounds are preferred, such as, for example, C1-C10 fluorinated compounds. In a preferred aspect, the fluorosurfactant is an anionic C6-fluorocarbon compound, and is preferably substantially free of PFOS and PFOA, and more preferably, essentially free of PFOS and PFOA. In a preferred aspect, the multistage latex preferably includes up to about 0.5 wt %, more preferably about 0.1 to 0.3 wt %, based on the total weight of the multistage latex composition.

The composition described herein may include other components or additives, added to either the reaction mixture of monomers used to make the multistage latex, to the latex, or to a coating composition or base paint that includes the latex. Suitable additives are known to those of skill in the art and include, for example, surfactants, open time agents, pH adjustors, initiator and chaser solutions, cross-linking agents, preservatives, defoaming agents, anticorrosive agents, and combinations thereof.

In an aspect, the multistage latex composition described herein may include a coalescing agent that aids in film formation. Suitable coalescing agents or coalescent compounds are dispersible in a coating composition or paint that includes the latex described herein, and facilitate film formation at temperatures of less than about 25° C., and even at temperatures of 5 to 10° C. Preferred coalescing agents have VOC content of less than about 50%, preferably less than about 30%, more preferably, less than about 20%, and most preferably, less than about 15%. Exemplary suitable coalescing agents include low VOC compounds of the type described in detail at least in U.S. Pat. Nos. 6,762,230 and 7,812,079. Other suitable low VOC coalescents include Optifilm (Eastman Chemical, Kingsport Tenn.), Loxanol (Cognis, Kankakee Ill., now BASF), Archer RC (ADM, Decator Ill.), and the like. Conventional coalescing agents such as, Texanol (Eastman Chemical) and the like can also be used, either alone or in combination with other solvents such as, for example, 2-butoxyethanol (butyl cellosolve), diethylene glycol monobutyl ether (butyl carbitol), and the like, provided low VOC levels are maintained in the coating composition or paint.

Although coalescing agents are typically used in paint to aid in film formation, the paint made with the multistage latex described herein is oftentimes capable of film formation at low levels of coalescent, or even in the absence of coalescing agents, at film-forming temperatures of 25° C. or less, more preferably at temperatures of 10° C. or less. Accordingly, in an aspect, the coalescing agent is an optional ingredient in coating compositions or paints that include the latex described herein, and in a preferred aspect, the coating composition or paint is substantially free, and more preferably, essentially free of coalescing agents. In a preferred aspect, the composition described herein includes no more than about 15 wt %, preferably less than 15 wt %, more preferably less than about 10 wt % coalescing agent.

In an embodiment, the multistage latex composition described herein is suitable for use in a low-VOC or zero-VOC coating composition or a paint to be colored or tinted to a desired color and finish, such as an in-store tintable base paint, for example. In an aspect, the coating composition or paint may include one or more pigments, including pigments or fillers used to tone or opacify the in-store tintable base paint. Suitable examples of pigments include, without limitation, titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violent, DNA orange, and/or organic yellows (such as Hansa yellow), for example.

In an embodiment, the multistage latex composition can be used in a coating composition, such as a paint, especially a base paint to be colored or tinted at the point-of-sale of a paint of desired color and finish. In an aspect, the base paint may be clear (unpigmented) or pigmented prior to being colored or tinted. In an aspect, the base paint is tinted or colored in-store using one or more commercially available colorants. Suitable colorants which can be used in a coating composition or paint formulation include, for example, NovoColor (Color Corp. of America, Louisville Ky.) colorants, i.e. zero-VOC colorants compatible with water-based coating compositions as described herein. Preferred colorant compositions include a colorant component, i.e. a pigment dispersed in a liquid phase, a surfactant package that includes a latex-compatible surfactant, a carrier, and other optional additives. Exemplary colorant compositions include single colorant formulations compatible with latex paints, of the kind described in U.S. Pat. Nos. 6,488,760 and 7,659,340. These colorant compositions are uniform and do not require mixing before addition to a base paint formulation, have extended shelf-life, and show viscosity increase of less than about 15 KU, more preferably less than about 10 KU, when stored over an extended period of time at temperatures of about 40° to 50°.

In an aspect, the multistage latex composition can be used in a base paint formulation to be tinted to produce a dark or deeply colored paint. To produce such dark or deeply colored paint requires a high colorant load. In an aspect, the amount of colorant to be added to the base paint is determined by the desired color and finish (i.e. glossy, semi-gloss, satin, etc.) of the colored paint. Preferably, the paint includes up to about 20 wt % colorant, more preferably about 5 to 15 wt % colorant, and most preferably about 8 to 12 wt % colorant.

Typically, the viscosity of the base paint decreases when the colorant composition is added. A deeply colored paint requires a high colorant load, and therefore, the colored paint will have a lower viscosity and may have poor properties on application to a substrate. Moreover, as base paints are made to have low or no VOC by using softer polymers, and low or no VOC-containing colorants added to the base paint have a high percentage of non-volatile soft components, it is difficult to form a hard acrylic film or coating, with good mechanical properties, i.e. block resistance, and scrub resistance, for example. Surprisingly, the multistage latex described herein, when used in a base paint to be tinted to a colored paint, and especially a deeply colored paint, resists softening even at the high colorant load, with a correspondingly high percentage of non-volatile soft components, needed to make a deeply colored paint. Contrary to expectation, paints made using the multistage latex described herein provide excellent block resistance while maintaining superior scrub resistance when compared to commercially available latex polymers.

In contravention of industry bias, when used in paint applied at high temperatures and/or in very humid environments, the paint including multistage latex described herein displays excellent performance characteristics, with optimal scrub resistance and tack resistance, along with superior block resistance relative to formulations made using commercially available latex polymers.

In an embodiment, paints made with the multistage latex described herein demonstrate excellent block resistance. Block resistance is measured by a standard test as described below, and block ratings are assigned on a scale from 0 to 10, where a rating of 0 corresponds to very poor block resistance, and a rating of 10 corresponds to excellent block resistance. In an aspect, the paints described herein show 1-day and 7-day block ratings of preferably at least 6, more preferably at least 7, and most preferably at least 8.

In an embodiment, paints made with the multistage latex described herein demonstrate superior scrub resistance, when compared to commercially available formulations. Scrub resistance is measured by a standard test as described below. The film is cured for seven (7) days, and scrub resistance is reported as a number of scrubs applied before the film failed, i.e. scrubbed off the substrate surface. In an aspect, the paints described herein display scrub resistance of at least about 800 scrubs, more preferably at least about 1000, and most preferably at least about 1200.

In an embodiment, paints made with the multistage latex described herein demonstrate excellent tack resistance. Tack resistance is measured by a standard test as described below, and reported as the time following initial cure that the surface of the film is no longer sticky to the touch. In an aspect, the paints described herein preferably display a tack force of less than 1.1 lbF, and more preferably less than 0.7 lbF.

In an embodiment, paints made with the multistage latex described herein demonstrate excellent print resistance. Print resistance may be measured by the standard tests described below where specific materials are used to print on a paint film or coating film. Results are reported on a numerical scale from 1 to 10, based on the amount of material that remains stuck to the sample, where 0 represents 100% material stuck and 10 represents 0% material stuck. In an aspect, the paints described herein preferably display print resistance of at least about 8, preferably 9, more preferably 10.

In an aspect, the multistage latex composition described herein can be used in a coating composition or paint that further includes one or more additives. Suitable additives include, without limitation, fillers, thixotropes, rheological modifiers, matting agents, and the like. The additives may include one or more ingredients added to a paint to modify the properties or enhance paint performance during storage, handling, application and other or subsequent stages. Desirable performance characteristics of a paint formulation include, for example, chemical resistance, abrasion resistance (i.e. scrub resistance), tack resistance, hardness, gloss, reflectivity, appearance and/or a combination of such properties and similar other properties. Preferred performance enhancing additives include lacquers, waxes, flatting agents, additives to prevent mar, abrasion, and the like.

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

EXAMPLES

Unless indicated otherwise, the following test methods were utilized in the Examples that follow.

Scrub Resistance

The scrub resistance of the paint formulations is tested using ASTM D2486-96 (Standard Test Method for Scrub Resistance of Wall Paints).

Cheesecloth Print Resistance

The cheesecloth print resistance of the paint formulations is tested using ASTM D2064 (Standard Test Method for Print Resistance of Architectural Paints). Wet drawdowns are made on Leneta charts and the test is run at 60° C. for one hour with a 500 g weight.

Cotton Ball Print Resistance

The cotton ball print resistance of the paint versions is tested using a modified version of ASTM D2064, where half a cotton ball is used in place of cheesecloth. Briefly, the test uses 3-mil wet drawdowns on Leneta charts. Two inch square test samples are cut from the chart at various cure times. Half a cotton ball is placed between the paint sample and the bottom of the rubber stopper. The test is run with a 500 g weight on top of the stopper at 60° C. for one hour. The sample is then kept at room temperature for 30 minutes. The cotton is pulled off in one smooth motion. Samples are rated on a scale 0 to 10 based on the amount of cotton that remains stuck to the sample, where 0 represents 100% cotton stuck and 10 represents 0% cotton stuck.

Tack Test

The tack test used herein is modified from the test described in Cakmak et al, eXPRESS Polymer Letters (2011), 5, 1009-1016. In this test method, an electromechanical tensile tester is used to quantify surface tack, and method is optimized for use with paint formulations. Aluminum Q-panel sheets were painted and after 24 hours, cut into test samples. Each measurement was made on a separate panel and an average value of 3-6 panels was recorded. The run parameters on the tensile tester were: 5 lbF pressed into sample, 3 second hold-time, and 0.2 in/min velocity of the head fixture removing from the sample.

Block Resistance

The block resistance of the paint formulations is tested using ASTM D4946-89 (Standard Test Method for Blocking Resistance of Architectural Paints).

Scrape Adhesion Test

The adhesion of the paint formulation is tested using a modified version of ASTM D2197 (Standard Test Method for Adhesion of Organic Coatings by Scrape Adhesion). The test was used with a GARDCO Balanced Beam Scrape Adhesion and Mar Testers MODEL PA-2197B with a loop stylus fixture to measure the scrape adhesion values in grams. The test was modified to be completed on Leneta paper or Mylar chart as opposed to the aluminum panels indicated in the standard test method.

Example 1: Preparation of White High Gloss Formulation (Comparative)

A 100-gallon formulation of a white high-gloss paint was prepared using the ingredients listed in Table 1. The polymer in Table 1 is a commercially available latex polymer system known to provide optimal block resistance (Rhoplex™ HG706, available from Dow).

TABLE 1

| White High-gloss Formulation #1 | |
|---|---|
| Raw Material | Amount (lbs) |
| Water | 159 |
| Dispersant | 7.0 |
| Surfactant | 3.5 |
| Defoamer | 1.0 |
| Pigment | 225.0 |
| Polymer | 620.0 |
| Coalescent | 8.3 |
| Defoamer | 5.2 |
| Neutralizing Agent | 1.0 |

TABLE 1-continued

White High-gloss Formulation #1

| Raw Material | Amount (lbs) |
|---|---|
| High-shear Thickener | 6.8 |
| Low-shear Thickener | 4 |
| Total | 1040.8 |

Example 2: Preparation of White High-Gloss Formulation (Inventive)

A 100-gallon formulation of a white high-gloss paint was prepared using the ingredients listed in Table 2. The polymer in Table 2 is a multistage latex composition prepared by a sequential monomer feed process as described above, and including at least a first stage and a second stage, where the first stage includes about 2 to 4 wt % acrylic acid monomers.

TABLE 2

White High-Gloss Formulation #2

| Raw Material | Amount (lbs) |
|---|---|
| Water | 176.6 |
| Dispersant | 7.0 |
| Surfactant | 3.5 |
| Defoamer | 1.0 |
| Pigment | 225.0 |
| Polymer | 582.0 |
| Coalescent | 12.5 |
| Defoamer | 5.0 |
| Neutralizing Agent | 2.0 |
| High-shear Thickener | 24.8 |
| Low-shear Thickener | 2.8 |
| Total | 1036.5 |

Example 3: Clear High-Gloss Formulation (Comparative)

A 100-gallon formulation of a clear high-gloss base paint was prepared using the ingredients listed in Table 3. The polymer in Table 3 is a commercially available latex polymer system known to provide optimal block resistance. (Rhoplex™ HG706, available from Dow).

TABLE 3

Clear High-Gloss Formulation #3

| Raw Material | Amount (lbs) |
|---|---|
| Water | 190.7 |
| Polymer | 593.5 |

TABLE 3-continued

Clear High-Gloss Formulation #3

| Raw Material | Amount (lbs) |
|---|---|
| Defoamer | 4.0 |
| Surfactant | 8.8 |
| Neutralizing Agent | 1.0 |
| High-Shear Thickener | 50.0 |
| Low-Shear Thickener | 24.0 |
| Total | 872.0 |

Example 4: Clear High-Gloss Formulation (Inventive)

A 100-gallon formulation of a clear high-gloss base paint was prepared using the ingredients shown in Table 4. The polymer in Table 4 is a multistage latex composition prepared by a sequential monomer feed process as described above, and including at least a first stage and a second stage, where the first stage included about 2 to 4% by weight acrylic acid monomers.

TABLE 4

Clear High-Gloss Formulation #4

| Raw Material | Amount (lbs) |
|---|---|
| Water | 222.7 |
| Polymer | 556.3 |
| Defoamer | 4.0 |
| Surfactant | 8.8 |
| Neutralizing Agent | 1.0 |
| High-Shear Thickener | 50.0 |
| Low-Shear Thickener | 24.0 |
| Total | 866.8 |

Example 5. Comparative Testing of Paint Formulations

The formulations from Examples 3 and were used as paint formulations to coat test panels that were assessed for hardness, tack resistance, block resistance, scrub resistance, and gloss. For the clear formulations in Examples 3 and 4, the base paint formulation in each case was tinted using red, blue, or black colorants and a yellow oxide pigment as shown in Table 5A-5D. Different varieties of commercially available colorants are used for each tint, i.e., i.e. low-VOC water-only (1), low-VOC universal (2), VOC containing glycol-based universal (3), and low-VOC, universal (4). The colorants were used at a concentration of about 12 ounces of colorant per gallon of the base paint (i.e. 7.5 g/L of colorant) and the colored paint formulations were then coated onto test panels. Testing results are shown in Tables 5A to 5D and in FIG. 1.

TABLE 5A

Paint Performance for Paint with Yellow Tint

| | Scrubs (Average over 2 runs) | | | | Konig Hardness 72 h* | | | | HT Cheesecloth print test 24 h | | | | HT Cotton Ball Print Test 24 h | | | | Scrape Adhesion | | | |
|---|---|---|---|---|---|---|---|---|---|---|---|---|---|---|---|---|---|---|---|---|
| Ex # | 1 | 2 | 3 | 4 | 1 | 2 | 3 | 4 | 1 | 2 | 3 | 4 | 1 | 2 | 3 | 4 | 1 | 2 | 3 | 4 |
| #3 | 762.5 | — | — | — | 0 | 0 | 5 | 2 | 0 | 1 | 1 | 2 | 0 | 0 | 5 | 2 | 1500 | <500 | 3000 | <500 |
| #4 | 1162.5 | — | — | — | 9 | 10 | 9 | 10 | 10 | 10 | 9 | 9 | 9 | 10 | 9 | 10 | | | | |

*Clear base #3 has Konig hardness of 6; clear base #4 has Konig hardness of 17

TABLE 5B

Paint Performance for Paint with Red Tint

| Example | Average Tack Force 24 h (lbF) | | | | HT Cheesecloth print test 24 h | | | | HT Cotton Ball Print Test 24 h | | | |
|---|---|---|---|---|---|---|---|---|---|---|---|---|
| | 1 | 2 | 3 | 4 | 1 | 2 | 3 | 4 | 1 | 2 | 3 | 4 |
| #3 | 1.012 | — | — | — | 6 | 1 | 4 | 7 | 3 | 5 | 5 | 6 |
| #4 | 0.593 | — | — | — | 10 | 10 | 9 | 9 | 10 | 10 | 10 | 10 |

TABLE 5C

Paint Performance for Paint with Blue Tint

| Example | HT Cheesecloth print test 24 h | | | | HT Cotton Ball Print Test 24 h | | | |
|---|---|---|---|---|---|---|---|---|
| | 1 | 2 | 3 | 4 | 1 | 2 | 3 | 4 |
| #3 | 4 | 2 | 5 | 3 | 0 | 0 | 7 | 2 |
| #4 | 8 | 10 | 9 | 9 | 10 | 10 | 10 | 10 |

TABLE 5D

Paint Performance for Paint with Black Tint

| Example | HT Cheesecloth print test 24 h | | | | HT Cotton Ball Print Test 24 h | | | | Scrape Adhesion | | | |
|---|---|---|---|---|---|---|---|---|---|---|---|---|
| | 1 | 2 | 3 | 4 | 1 | 2 | 3 | 4 | 1 | 2 | 3 | 4 |
| #3 | 4 | 2 | 5 | 3 | 0 | 0 | 7 | 2 | 2500 | 1500 | 2500 | 3000 |
| #4 | 8 | 10 | 9 | 9 | 10 | 10 | 10 | 10 | 3500 | 3500 | 4500 | 3500 |

Example 6. Effect of Acid Content on Performance

The white paint formulation of Example 2 was prepared with different acid monomer content in the first stage as shown in Table 6 below. These formulations in Examples 2A to 2D were used as paint formulations to coat test panels that were assessed for hardness, tack resistance, block resistance, scrub resistance, and gloss. Testing results are shown in Table 6.

TABLE 6

Effect of Acid Type and Amount on Performance

| Example | Formulation | Scrub (Average of 4 runs) | 20° gloss (1/3/7 days) | 60° gloss (1/3/7 days) |
|---|---|---|---|---|
| #1 (Comparative) | Commercial | 650 | 47/48/47 | 79/79/79 |
| Example 2A | 2% MAA | 1200+ | 40/39/39 | 76/75/75 |
| Example 2B | 4% MAA | 825 | 44/43/43 | 78/76/77 |
| Example 2C | 2% AA | 1200+ | 42/41/40 | 76/76/76 |
| Example 2D | 4% AA | 1200+ | 48/45/46 | 79/78/78 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A coating composition, comprising:
   an in-store tintable liquid base paint formulation, comprising
   a multistage latex polymer having at least a first stage with a Tg of greater than about 0 to 120° C. and at least about 1% by weight acrylic acid monomer; and at least a second stage with a Tg of −35 to 10° C.; and
   a fluorosurfactant; and
   about 0 to 15 wt % of one or more colorant compositions having volatile organic content (VOC) of less than about 50 g/L; which colorants are added to the base paint formulation at a point-of-sale to achieve a desired color;
   wherein the coating composition displays a scrub resistance of at least about 800 scrubs.

2. The composition of claim 1, made by a process comprising the steps of:
   providing a container with a quantity of the in-store tintable base paint formulation and headspace sufficient to receive a quantity of one or more low VOC colorants;
   providing instructions for dispensing the low VOC colorant into the base paint formulation at a point-of-sale, and in a particular amount, to obtain a coating composition of a desired color.

3. The composition of claim 1, wherein the multistage latex polymer is made by a method comprising:
   preparing a first mixture of monomers for a first stage, the first mixture comprising about 65 to 75 wt % methyl methacrylate, 15 to 20% butyl acrylate, 2 to 4 wt % acrylic acid, about 0.5 to 1.5 wt % ureido-functional monomer, and optionally, about 2 to 4 wt % diacetone acrylamide, based on the total weight of the monomers in the first mixture;
   preparing a second mixture of monomers for a second stage, the second mixture comprising about 30 to 40 wt % methyl methacrylate, about 45 to 55 wt % butyl acrylate, about 1 to 3 wt % methacrylic acid, about 2 to 4 wt % diacetone acrylamide, and about 0.5 to 1.5 wt % ureido-functional monomers, based on the total weight of the monomers in the second mixture;
   feeding the first mixture into a reactor vessel;
   initiating a free radical polymerization of at least the first mixture; and
   feeding the second mixture into the reactor vessel.

4. The composition of claim 1, wherein the multistage latex is capable of forming a film at a temperature of 4° C. or less.

5. The composition of claim 1, wherein the multistage latex is capable of forming a film at a temperature of 10° C. or less, in the absence of a separate coalescing agent.

6. The composition of claim 1, wherein the composition further includes no more than about 15 wt % coalescing agent, and is capable of forming a film at a temperature of 25° C. or less.

7. The composition of claim 1, wherein the monomers forming the first stage or second stage comprise one or more ureido-functional monomers.

8. The composition of claim 3, wherein the monomers forming the first stage or second stage further comprise one or more polyfunctional acrylate monomers.

9. The composition of claim 1, wherein the difference in Tg of the first and second stage monomers (ΔTg) is less than about 60° C.

10. The composition of claim 1, wherein the difference in Tg of the first and second stage monomers (ΔTg) is less than about 50° C.

11. The composition of claim 1, wherein the composition exhibits block resistance rating of at least 6.

12. The composition of claim 1, wherein the composition exhibits average scrub resistance of at least about 1000 scrubs.

13. The composition of claim 1, wherein the composition exhibits tack resistance force of less than 1.1 lbF.

14. The composition of claim 12, wherein the composition exhibits average scrub resistance of at least about 1200 scrubs.

15. The composition of claim 1, wherein the composition exhibits 20° gloss of at least 45.

16. The composition of claim 1, wherein the composition exhibits 60° gloss of at least 75.

17. The composition of claim 1, wherein the composition exhibits Konig hardness of at least 9.

18. The composition of claim 1, wherein the composition exhibits print resistance of at least 8 as determined by ASTM D2064.

19. The composition of claim 1, wherein the fluorosurfactant is present in an amount of up to about 0.5 wt %.

20. The composition of claim 19, wherein the fluorosurfactant is present in an amount of 0.1 to 0.3 wt %.

21. The composition of claim 1, wherein the multistage latex polymer has at least a first stage with a Tg of 25° C. to 75° C.

22. The composition of claim 21, wherein the monomers forming the first stage or second stage comprise diacetone acrylamide.

23. The composition of claim 9, wherein the monomers forming the first stage or second stage comprise diacetone acrylamide.

24. A coating composition, comprising:
an in-store tintable liquid base paint formulation, comprising
a multistage latex polymer having at least a first stage with a Tg of greater than about 0 to 120° C. and at least about 1% by weight acrylic acid monomer; and at least a second stage with a Tg of −35 to 10° C.; wherein the difference in Tg of the first and second stage monomers (ΔTg) is less than about 60° C.; and
a fluorosurfactant; and
about 0 to 15 wt % of one or more colorant compositions having volatile organic content (VOC) of less than about 50 g/L; which colorants are added to the base paint formulation at a point-of-sale to achieve a desired color;
wherein the coating composition displays a scrub resistance of at least about 800 scrubs, and a block resistance rating of at least 6.

25. The composition of claim 24, wherein the multistage latex polymer has at least a first stage with a Tg of 25° C. to 75° C.

26. The composition of claim 24, wherein the monomers forming the first stage or second stage comprise diacetone acrylamide.

27. The composition of claim 24, wherein the composition exhibits tack resistance force of less than 1.1 lbF.

28. A coating composition, comprising:
an in-store tintable liquid base paint formulation, comprising
a multistage latex polymer having at least a first stage with a Tg of 25° C. to 75° C. and at least about 1% by weight acrylic acid monomer; and at least a second stage with a Tg of −35 to 10° C.; wherein the monomers forming the first stage or second stage comprise diacetone acrylamide; and
a fluorosurfactant; and
about 0 to 15 wt % of one or more colorant compositions having volatile organic content (VOC) of less than about 50 g/L; which colorants are added to the base paint formulation at a point-of-sale to achieve a desired color;
wherein the coating composition displays a scrub resistance of at least about 800 scrubs, and a block resistance rating of at least 6.

* * * * *